United States Patent
Manning

[15] 3,686,309
[45] Aug. 22, 1972

[54] N-(DICHLORO-α-HYDROXYBENZYL)-N'-AMIDINOHYDRAZINES AND THE SALT THEREOF

[72] Inventor: Robert E. Manning, Mountain Lakes, N.J.

[73] Assignee: Sandoz-Wander, Inc., Hanover, N.J.

[22] Filed: Aug. 10, 1970

[21] Appl. No.: 62,658

Related U.S. Application Data

[63] Continuation-in-part of Ser. No. 755,401, Aug. 26, 1968, abandoned.

[52] U.S. Cl. ............260/564 F, 260/501.14, 424/326
[51] Int. Cl. .......................................C07c 133/10
[58] Field of Search .......260/564 F, 501.14; 424/326

[56] References Cited

UNITED STATES PATENTS 3,383,409 5/1968 Bream et al............260/564 X

FOREIGN PATENTS OR APPLICATIONS 1,019,120 2/1966 Great Britain.............260/564

Primary Examiner—Robert V. Hines
Attorney—Gerald D. Sharkin, Frederick H. Weinfeldt, Robert S. Honor, Walter F. Jewell and Richard E. Vila

[57] ABSTRACT

This disclosure relates to dichlorobenzylamidinohydrazines, e.g., N-(2,6-dichloro-α-hydroxybenzyl)-N'-amidinohydrazine hydrochloride. These compounds are useful as hypotensives.

6 Claims, No Drawings

N-(DICHLORO-α-HYDROXYBENZYL)-N'-AMIDINOHYDRAZINES AND THE SALT THEREOF

This application is a continuation in part of application, Ser. No. 755,401 filed Aug. 26, 1968 and now abandoned.

This invention relates to benzylamidinohydrazines. More particularly, this invention concerns substituted dichlorobenzylamidino-hydrazines, acid addition salts thereof and to methods for their preparation. The substituted benzylamidino hydrazines of this invention may be represented by the following structural formula:

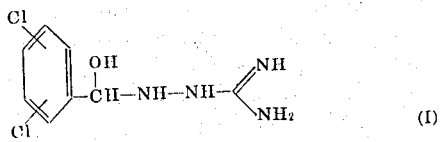
(I)

The compounds of formula (I) in acid addition salt form (Ia) may be prepared by treating in solvent an aldehyde of the formula:

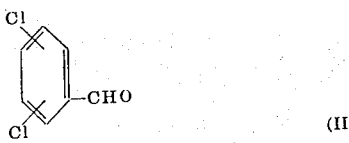
(II)

with a monobasic acid addition salt amidinohydrazine (amino guanidine).

In accordance with the above process, the compounds of formula (Ia) are prepared by treating the aldehydes of formula (II) with the acid salt of a amidinohydrazine in loweralkanol solvent, e.g., methanol or ethanol. The desired product is obtained when a catalytic amount of alkali metal alkoxide is present in the reaction mixture. As illustrative of the alkali metal alkoxides which may be used, there may be mentioned sodium methoxide and sodium ethoxide. The presence of said alkali metal alkoxide base is critical to successfully obtaining the compounds of formula (Ia). Moreover, it is critical that the reaction be conducted at a temperature of from about 15° – 35° C., room temperature being preferred.

The hydrazine acid addition salts which may be used include monobasic acid addition salts, preferably the mineral acid salts, e.g., the hydrohalides such as hydrogen chlorides and hydrogen bromide, or the nitrate, phosphate, and the like. The resulting product (Ia) is recovered by conventional techniques such as filtration. The amidino hydrazine and the compounds of formula (II) are known and may be prepared according to methods disclosed in the literature. When it is desired to convert the compounds of formula (Ia) to the corresponding free bases (I), conventional techniques may be utilized, e.g. dissolution of the salt in water and precipitation using a base such as sodium carbonate.

The compounds represented by formula (I) and (Ia) above are useful because they possess pharmaceutical properties in animals. In particular, these compounds are useful as hypotensives, as indicated by their activity in anesthetized cat tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

In general, satisfactory results are obtained when these compounds are administered at a daily dosage of about .01 milligrams to about 5.0 milligrams per kilogram of animal body weight. This daily dosage is preferably administered 2 to 4 times a day, or in sustained release form. For most large mammals such as primates, the total daily dosage is from about 1.0 milligrams to about 40.0 milligrams. Dosage forms suitable for internal use comprise from about 0.25 milligrams to about 20 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient | Parts by Weight |
|---|---|
| N-(2,6-dichloro-α-hydroxybenzyl)-N'-amidinohydrazine hydrochloride | 30 |
| tragacanth | 2 |
| lactose | 59.5 |
| corn starch | 5 |
| talcum | 3 |
| magnesium stearate | 0.5 |

The following example is provided for the purpose of illustration and not by way of limitation. It is not intended so as to limit the scope of the invention as defined in the appended claims.

EXAMPLE 1

N-(2,6-dichloro-α-hydroxybenzyl)-N'-amidinohydrazine hydrochloride

To a solution of amidinohydrazine hydrochloride (1.0 g) in methanol (10 ml) containing 25 mg of sodium methoxide is added 2,6-dichlorobenzaldehyde (1.8 g). The reaction mixture is admixed at room temperature and after 15 minutes the resultant solid is collected by filtration to afford 2.0 g of N-2,6-dichloro-α-hydroxybenzyl-N'-amidinohydrazine hydrochloride; m.p. 164°–165° C.

Following the above procedure but in place of amidinohydrazine hydrochloride and starting with a. amidinohydrazine hydronitrate, or
b. amidinohydrazine · ½ H₂SO₄ the following products are prepared:
a. N-(2,6-dichloro-α-hydroxybenzyl)-N'-amidinohydrazine hydronitrate, and
b. N-(2,6-dichloro-α-hydroxybenzyl)-N'-amidinohydrazine sulfate, respectively.

EXAMPLE 2

N-(2,6-dichloro-α-hydroxybenzyl)-N'-amidinohydrazine 2.85 g of N-(2,6-dichloro-α-hydroxybenzyl)-N'-amidinohydrazine hydrochloride is suspended in 20 ml of methanol and treated with 20 ml of a 1 N solution of sodium carbonate. The resultant solid is collected by filtration to give the product N-(2,6-dichloro-α-hydroxybenzyl)-N'-amidino-hydrazine.

What is claimed is:

1. A compound of the formula

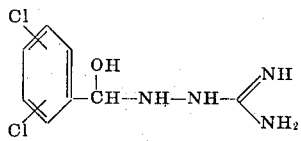

2. A compound of the formula

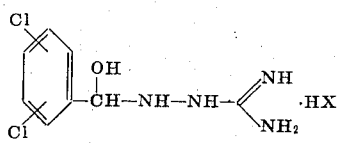

where X represents a monovalent anion.

3. A compound of the formula

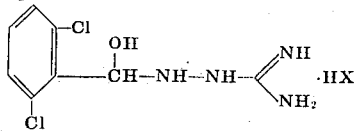

where X represents a monovalent anion.

4. A compound according to claim 3 where X represents Cl.

5. A process for preparing the compounds according to claim 1 which comprises treating at a temperature of 15°–35° C. a compound of the formula

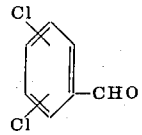

with a monobasic acid addition salt of amidinohydrazine in loweralkanol solvent and in the presence of a catalytic amount of alkali metal alkoxide.

6. A process for preparing N-(2,6-dichloro-α-hydroxybenzyl)-N'-amidinohydrazine hydrochloride, which comprises treating at 15°–35° C. 2,6-dichlorobenzaldehyde with amidinohydrazine hydrochloride in methanol and in the presence of a catalytic amount of sodium methoxide.

* * * * *